United States Patent [19]

Nilssen

[11] 4,307,353

[45] Dec. 22, 1981

[54] BIAS CONTROL FOR HIGH EFFICIENCY INVERTER CIRCUIT

[76] Inventor: Ole K. Nilssen, Caesar Dr., Rte. 4, Barrington, Ill. 60010

[21] Appl. No.: 103,624

[22] Filed: Dec. 14, 1979

[51] Int. Cl.³ .................... H02M 7/537; H03K 3/30
[52] U.S. Cl. ............................. 331/113 A; 363/22; 363/133
[58] Field of Search ............ 331/113 A; 363/22, 133

[56] References Cited

U.S. PATENT DOCUMENTS 4,002,999 1/1977 Hesler et al. .................. 331/113 A
4,004,251 1/1977 Hesler et al. .................. 331/113 A

*Primary Examiner*—Siegfried H. Grimm
*Attorney, Agent, or Firm*—Ray E. Snyder

[57] ABSTRACT

An improved high efficiency push-pull inverter circuit employing a pair of switching transistors that are alternately triggered into conduction by a control circuit, for converting DC voltage into high frequency AC voltage. The control circuit includes a pair of saturable transformers that are non-coupled to each other and are each connected to the base of a respective transistor. The bases are isolated from ground potential by a capacitor, and significant reverse voltage signals are developed and alternately applied to the base of a conducting transistor for rapidly turning it off, thereby increasing device switching speed and overall efficiency of the circuit.

22 Claims, 4 Drawing Figures

4,307,353

BIAS CONTROL FOR HIGH EFFICIENCY INVERTER CIRCUIT

BACKGROUND OF THE INVENTION

1. Field of the Invention

This invention relates generally to the field of electrical energy conversion systems and more particularly to electrical inverter circuits utilizing a solid state active element oscillator of the multivibrator type to convert DC voltage into AC voltage.

2. Description of the Prior Art

This invention is an improvement to the invention entitled High Efficiency Push-Pull Inverters described in my earlier filed application, Ser. No. 890,586, filed Mar. 20, 1978, and now issued as U.S. Pat. No. 4,184,128 on Jan. 15, 1980.

SUMMARY OF THE INVENTION

It is an object of the present invention to provide an improved bias control to the bases of a pair of switching transistors connected to operate in a push-pull inverter circuit.

It is a more particular object to provide improved switching control of the transistors by the provision of significant reverse voltage on the base of a conducting transistor for rapidly evacuating charge carriers.

It is a still more particular object to provide a control circuit containing a pair of separate, non-coupled, saturable transformers connected to the bases of the switching transistors and a capacitor connected to one winding of each saturable transformer and effective to isolate the bases from ground potential.

It is still a more particular object to provide a pair of diodes also connected to the bases of the transistors and connected through a common Zener diode to B−.

DETAILED DESCRIPTION OF THE PREFERRED EMBODIMENT

Figure 1:
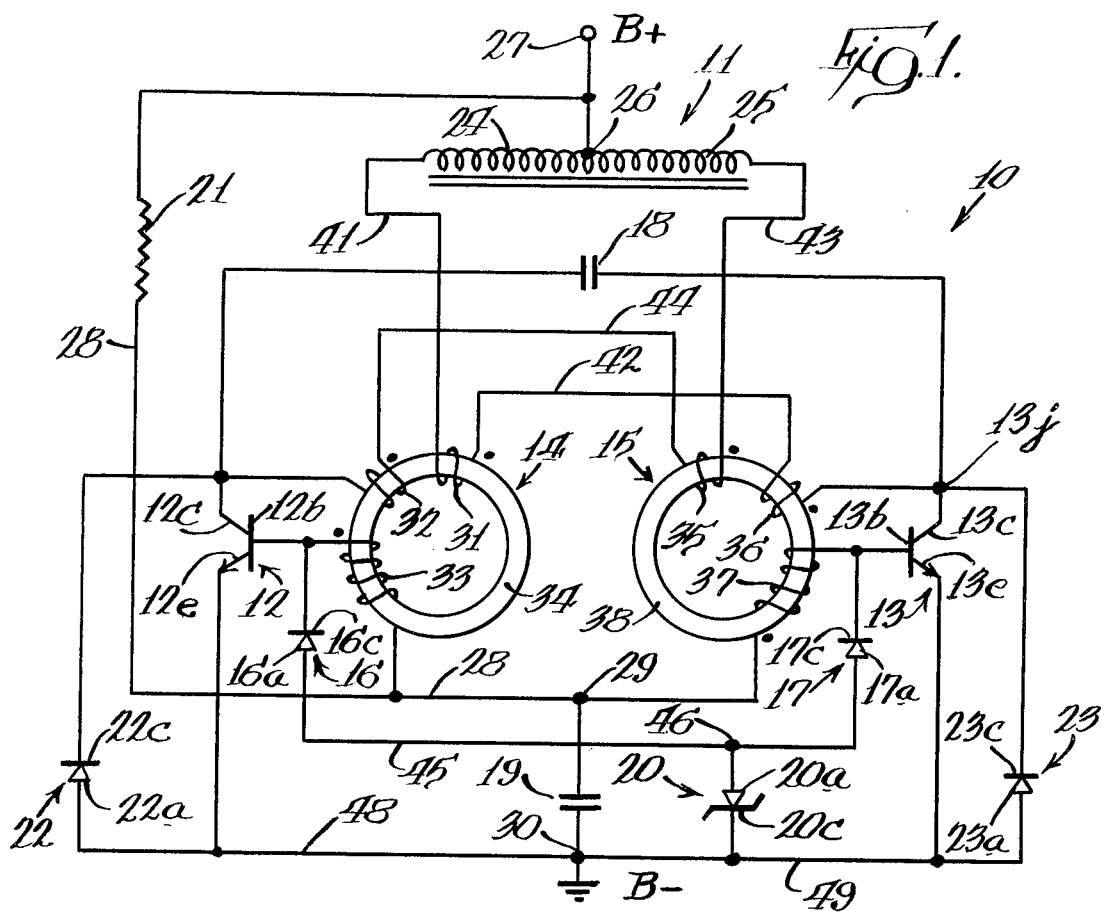
FIG. 1 is a schematic diagram of the complete inverter circuit providing the improved bias control of the present invention.

The improved inverter circuit of the present invention is illustrated in FIG. 1 and is designated as a whole by the numeral 10. The circuit 10 comprises an output transformer 11, switching transistors 12 and 13, separate saturable transformers 14 and 15, diodes 16 and 17, capacitors 18 and 19, Zener diode 20, resistor 21, and shunt diodes 22 and 23.

The winding of the power output transformer 11 is divided into halves 24 and 25 by a center tap 26. The center tap 26 is connected to a B+ terminal 27 and to one end of resistor 21. The other end of resistor 21 is connected by a lead 28 to a junction 29 which, in turn, is connected to one side of the capacitor 19. The other side of the capacitor 19 is connected to a B− terminal 30, which may be at ground potential.

The transistor 12 has a base 12b, collector 12c, and emitter 12e. Similarly, the transistor 13 has a base 13b, collector 13c, and emitter 13e. The capacitor 18 is connected between the collectors 12c and 13c.

The transformer 14 has windings 31, 32 and 33 wound on a torodial core 34. Similarly, the transformer 15 has windings 35, 36 and 37 wound on a torodial core 38. One end of winding 24 of the output transformer 11 is connected by a lead 41 to one end of the winding 31. The other end of winding 31 is connected by a lead 42 to one end of winding 36. The other end of winding 36 is connected to the collector 13c. The free end of winding 25 of the transformer 11 is connected by means of a lead 43 to one end of winding 35. The other end of winding 35 is connected by a lead 44 to one end of winding 32. The other end of winding 32 is connected to the collector 12c. One end of winding 33 is connected to the base 12b, the other end of winding 33 is connected by lead 28 through the junction 29 to one end of winding 37. The other end of winding 37 is connected to the base 13b. The diode 16 has a cathode 16c, which is connected to the base 12b, and an anode 16a which is connected through a lead 45 to a junction 46. The diode 17 has an anode 17a connected to the junction 46 and a cathode 17C connected to the base 13b. The Zener diode 20 has an anode 20a connected to the junction 46 and a cathode 20c connected to the B− terminal 30. The emitter 12e is connected by a lead 48 to the B− terminal 30, and the emitter 13e is connected by a lead 49 to the B− terminal 30. The shunt diode 22 has a cathode 22c connected to the collector 12c and an anode 22a connected to the emitter 12e. Similarly, the shunt diode 23 has a cathode 23c connected to the collector 13c and an anode 23a connected to the emitter 13e.

In operation, the inverter circuit 10 functions as follows:

A positive bias signal is supplied from B+ through the resistor 21, lead 28 and windings 33 and 37 to the bases 12b and 13b. Because of inherent instability in the circuit, one or the other of these transistors will be triggered into full forward conduction. The resistor 21 is relatively large, of a magnitude of 330 K. ohms or more, and effectively renders the bias signal from B+ inconsequential once the circuit 10 begins to oscillate. Assume that transistor 12 begins to conduct first. At this point in time, current passes from B+ through winding 25, lead 43, winding 35, led 44, winding 32, collector 12c, emitter 12e, and lead 48 to the B− terminal 30. The current flowing through winding 32 of transformer 14 induces a current in the winding 33 which is supplied as a positive control signal to the base of 12b to maintain the transistor 12 in the state of full conduction. The magnitude of the positive voltage developed at the base 12b due to this current may be approximately +0.7 volts. The same current flowing through winding 32 flows through winding 35 of the transformer 15 and induces a current in the winding 37 which results in a negative signal to the base 13b to maintain the transistor 13 in an off condition. The current path for the positive signal supplied from winding 33 is through base 12b, emitter 12e, lead 48 to the B− terminal 30. From B− return current flows through capacitor 19 and lead 28 to the other end of winding 33.

At the same time, the current flowing through winding 35 of transformer 15 induces a current in the winding 37. The direction of flow of this current is from one end of winding 37 through capacitor 19 to B−, and from B− through lead 49, Zener diode 20 and diode 17 to the other end of winding 37. This latter current through capacitor 19 substantially balances the current in the opposite direction due to current flow through winding 33 and these two effectively cancel out. The implication of this condition is that the capacitor 19 does not need to be very large to effectively filter transients at the junction point 29 or on the lead 28, hereinafter called the bias conductor. It should be observed that the inverter circuit 10 as a whole is basically symmetrical in terms of components and number of windings of the transformers.

Figure 2A:
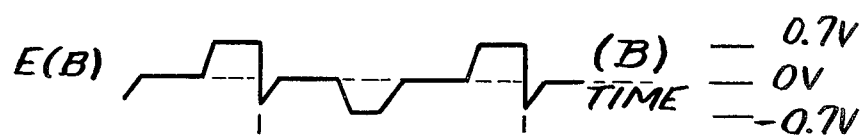
FIG. 2A is a wave-form diagram representative of the base voltage as described in application Ser. No. 890,586.
Figure 2B:
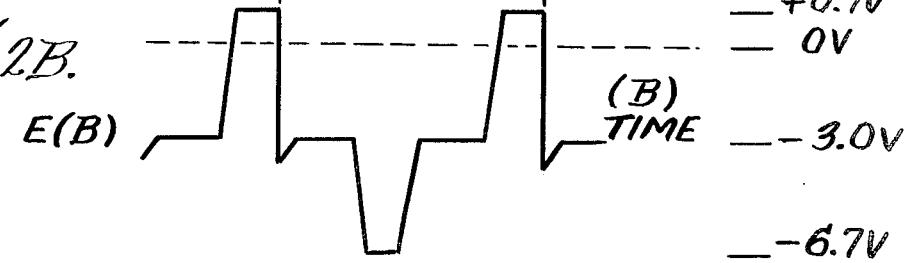
FIG. 2B is a wave-form diagram representative of the operation of the circuit of the present invention.

The magnitude of the negative voltage established at the base 13b must be less than the base-emitter breakdown voltage of the transistor 13 and typically may have a magnitude of approximately −6.7 volts. This voltage difference established between B− and the base 13b will appear as a voltage drop across the Zener diode 20 and across the diode 17. The largest portion of this voltage drop, perhaps 6 volts, will appear across the Zener diode 20 and the remainder across the diode 17. With a negative voltage at the base 13b and a slightly positive voltage at the base 12b, the junction point 29 and bias conductor 28 between the transformers 14 and 15 will have a voltage of approximately −3 volts, as illustrated in FIG. 2B.

At some point in time, the core 34 of transformer 14 will saturate, at which time the winding 33 effectively becomes a short circuit between the base 12b and bias conductor 28 or junction 29. The negative voltage present on conductor 28 is effective to rapidly evacuate charge carriers from the base 12b and switch transistor 12 into an off condition. This results in a transient positive current due to the outflow of charge carriers from the base 12b through winding 33 to the junction 29. The capacitor 19 has sufficient capacity to accept these charge carriers without permitting the voltage to rise significantly at the junction 29.

The leakage inductance in the transformer 11 tends to maintain current flow through the transistor 12, but since it is now effectively an open switch, the voltage at the collector 12c begins to rise and the voltage at the collector 13c drops. The previously established current through winding 25 is now effectively divided so as to maintain a constant number of ampere turns and half of the current continues to flow through winding 25 and windings 35 and 32 through capacitor 18 to a junction 13j leading to the collector 13c. The other half of the current flows through winding 36 and 31 and through winding 24 back to B+. This current flow back through winding 24 will continue until all the energy stored in the inductance of transformer 11 has been stored in capacitor 18 or returned to B+. The voltage at the collector 13c will continue to drop and will eventually become slightly negative. When this occurs, the voltage cannot drop any further because of the clamping effect of diode 23. Reverse current will flow from B− through the diode 23 to the junction 13j and through windings 36, 31 and 24 back to B+. The capacitor 18 has become charged to an upper limit permitted by the clamping and current through windings 32 and 35 is cut off completely. The direction of this reverse current flow through winding 24 is effective in the magnetic sense as the previously described positive current through winding 25. The diode 23 effectively clamps the transistor 13 so that the collector 13c cannot go more negative than approxmately −0.7 volts. Due to the clamping action of the diode 23 the voltage at the collector 12c cannot rise to more than twice B+, plus whatever drop occurs across the diode 23. The reverse current through diode 23 gradually declines to 0. After a point this declining current through winding 36 will effectively be reflected in transformer 15 as a positive current going in the opposite direction. This in turn will induce a positive current in the winding 37 which is applied to the base 13b. The transistor 13 is then triggered into conduction and a positive current flows from B+ through winding 24, lead 41, windings 31 and 36 to the collector 13c, emitter 13e and lead 49 to B−. The complete path for the signal current induced in winding 37 is now through base 13b, emitter 13e, lead 49, and capacitor 19 to the other end of winding 37. Simultaneously, another circulating current will be induced in the transformer 14 due to current flowing through winding 31. This latter current path will be from winding 33 through capacitor 19, lead 48, and emitter 12e, base 12b back to the other end of winding 33. As previously described, the two circulating currents flowing in opposite directions through capacitor 19 effectively cancel out, but the common bias conductor 28 is again maintained at a negative voltage of approximately −3 volts. The leads 48 and 49 are both at the same B− potential and together constitute a common reference conductor as defined herein. The positive current through winding 36 of transformer 15 and through the emitter and collector of transistor 13 to B− continues until the transformer 15 saturates. When this occurs, the base 13b then is subjected to the potential existing at the junction 29 of the approximately −3 volts. This negative voltage rapidly evacuates the charge carriers from the base 13b and turns the transistor 13 off. The transistor 12 is then switched on and the cycle repeated as previously described.

It should be noted that in an operative condition the lead 28 and junction 29 is always maintained at a lower potential than the B− terminal 30, which may be at ground potential. This ensures that when negative signals due to saturation of the transformers 14 or 15 are applied to the base of a conducting transistor, the base is always at a lower potential than its respective emitter. This in turn ensures that the charge carriers stored at the bases are rapidly evacuated for switching the transistor off. The capacitor 19 is large enough to absorb these carriers without significantly raising the potential at the junction 29. The capacitor 19 is also effective to filter out any transients that may be developed on the lead 28.

It is contemplated that devices other than the Zener diode 20 might be used to establish the negative bias potential. The Zener 20 is desirable because of its cost-effectiveness, but a resistor might also be used for example. The presence of the Zener 20 or a resistor in the circuit also makes it particularly desirable to include the shunt diodes 22 and 23 to eliminate the power dissipation that would otherwise occur in the Zener 20 during the reverse current conditions through either the transistors 12 or 13.

Figure 3:
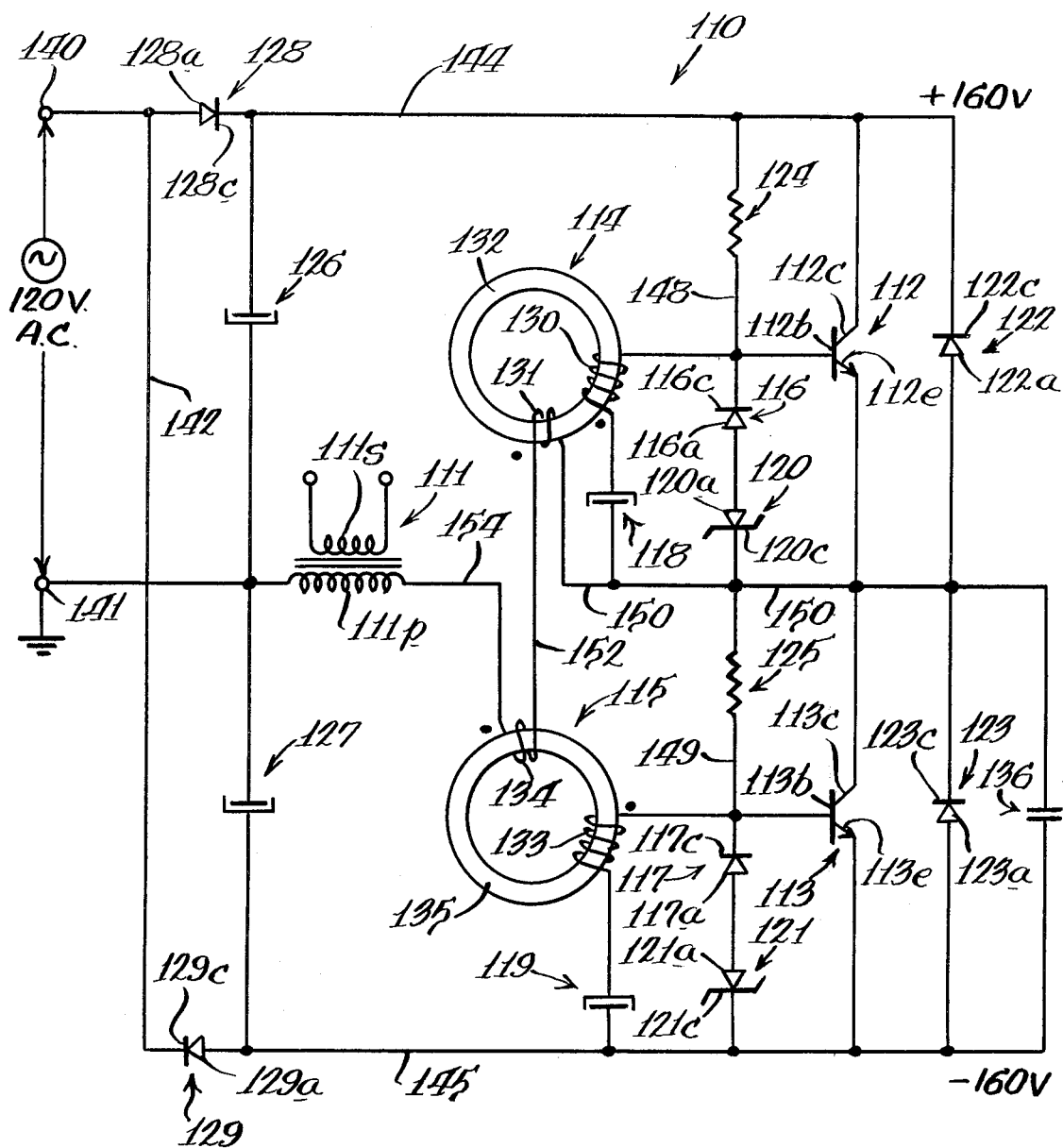
FIG. 3 is a schematic diagram of a series connected transistor inverter circuit utilizing the principles of the invention.

Referring now to FIG. 3, there is illustrated a modified circuit in which the switching transistors are connected in series. The circuit 110 illustrated in FIG. 3 allows the use of relatively common low voltage rated transistors that are commercially available in a high voltage application. The circuit 110 comprises an output transformer 111, switching transistors 112 and 113, saturable current transformers 114 and 115, diodes 116 and 117, capacitors 118 and 119, Zener diodes 120 and 121, shunt diodes 122 and 123, resistors 124 and 125, filter capacitors 126 and 127, and rectifying diodes 128 and 129. The transistor 112 has a base, collector and emitter designated by 112b, 112c and 112e, respectively. Transistor 113 has a base, collector and emitter similarly designated. Each of the diodes 116, 117, 120, 121, 122, 123, 128 and 129 have an anode and cathode designated by the respective numerical prefix. The saturable transformer 114 has windings 130 and 131 wound on a toroidal core 132. Similarly, the saturable transformer 115 has windings 133 and 134 wound on a toroidal core 135.

The circuit 110 is adapted to be connected to a 120-volt AC source through terminals 140 and 141. The terminal 141 may be at ground potential. The terminal 140 is connected to the anode 128a of diode 128 and by means of a conductor 142 to the cathode of 129c of diode 129. The cathode 128c of diode 128 is connected to a lead 144, hereinafter referred to as the B+ conductor, and the anode 129a of diode 129 is connected to a lead 145, hereinafter referred to as the B− conductor. The AC voltage impressed across the terminals 140 and 141 is rectified by the diodes 128 and 129, and filtered by the capacitors 126 and 127 so as to establish a positive potential of approximately +160 volts on the lead 144 and a voltage of approximately −160 volts on the conductor 145. The circuit 110 thus effectively doubles the input voltage that is impressed across the series connected transistors 112 and 113.

The transformer 111 may have a primary winding 111p and a secondary winding 111s. One end of the winding 111p is connected by means of a lead 146 to the input terminal 141.

The B+ lead 144 is connected to one end of resistor 124, to the collector 112c, and to the cathode 122c. The other end of resistor 124 is connected to a lead 148 which connects the base 112b, the cathode 116c, and one end of winding 130 of transformer 114. Emitter 112e and anode 122a are connected to a central lead 150. The diode 116 and Zener diode 120 are connected in series between the lead 148 and 150 with the cathode 120c being connected to the lead 150. The lead 150 is also connected through capacitor 118 to the other end of winding 130 and to one end of winding 131. The other end of winding 131 is connected by a lead 152 to one end of winding 134 on transformer 115, the other end of winding 134 is connected by a lead 154 to the other end of winding 111p.

The central lead 150 is also connected to one end of resistor 125, to the collector 113c, and to the cathode 123c. The other end of resistor 125 is connected to a lead 149 which also connects the base 113b, the cathode 117c, and one end of winding 133 of transformer 115. The other end of winding 133 is connected through capacitor 119 to the B− lead 145. The diode 117 and Zener diode 121 are connected in series between the leads 149 and 145 and the emitter 113e and anode 123a are also connected to the B− lead 145. A capacitor 136 is connected between the central lead 150 and the B− lead 145. This capacitor serves to limit the rate of rise in voltage at the collector of a transistor as it is turned off, as described in my earlier application.

In operation, the circuit 110 functions as follows:

The positive voltage developed on the lead 144 and the negative voltage on lead 145 causes a trickle current to flow through resistor 124, transistor 112, resistor 125 and transistor 113 to the lead 145. This trickle current results in a slightly positive bias voltage being applied to the bases 112b and 113b of both transistors. This same bias voltage also results in an initial slightly positive charge being developed on the capacitors 118 and 119. Because of imbalances in the circuit, one or the other of the transistors 112 or 113 will be triggered into conduction. Assume that transistor 112 is the first to begin to conduct. When this occurs, current flows from the B+ conductor 144 through collector 112c, emitter 112e, lead 150, winding 131, lead 152, winding 134, lead 154, the primary winding 111p and through capacitor 126 to return to the lead 144. The current flowing through the winding 131 induces a proportional feedback current in the winding 130 which is supplied to the base 112b as a positive signal of perhaps +0.7 volts for maintaining the transistor 112 in a state of full conduction. The complete path for the circulating feedback current is from one end of winding 130 through the base 112b, emitter 112e, lead 150 and capacitor 118 back to the other end of winding 130. This condition persists until the transformer 114 saturates. When this occurs, the transistor 112 is abruptly cut off and in a brief interval the transistor 113 begins to conduct.

When the transistor 112 was in a state of full conduction, the same current flowing through winding 131 flowed through winding 134 of transformer 115 and developed a negative feedback signal in the winding 133 which was applied to the base 113b to maintain it in an off condition. This negative signal applied to the base 113b may have a magnitude of approximately −6.7 volts relative to the emitter 113e. This voltage drop appears across the series connection of diode 117 and Zener diode 121 and also results in the development of a negative voltage across the capacitor 119.

When the transistor 113 is triggered into conduction, the current path established is from the lead 150 through the collector 113c, emitter 113e, lead 145, capacitor 127, primary winding 111p, winding 134, winding 131 and back to lead 150. This current flow path is in the opposite direction through the primary winding 111p and through the windings 134 and 131 of the saturable transformers from that described when transistor 112 was conducting. This current flowing through winding 131 induces a negative current in winding 130 which is applied to the base 112b to maintain it in an off condition. At the same time, the current flowing through winding 134 induces a positive current in the winding 133 which is applied to the base 113b to maintain it in a state of full conduction. The magnitude of the voltage developed between the lead 148 and 150 again may be approximately +0.7 volts in the full conduction state and −6.7 volts when a negative feedback signal is applied.

After a few initial cycles of operation, the capacitors 118 and 119 become charged negatively to a relatively stable voltage which may have a magnitude of approximately −3 volts. This negative voltage is approximately the average of the voltage developed across the base emitter junction of each transistor in the states of conduction and non-conduction. As described earlier for the parallel circuit, there is no balancing current, hence the capacitors 118 and 119 are relatively large in this application and are capable of storing or absorbing sufficient charge for maintaining a negative bias for the respective transistor. This insures that in a steady state oscillation, a negative bias voltage will be present on each of the capacitors 118 and 119. When the associated transformer 114 or 115 saturates, the windings 130 and 133 effectively become short circuits so that the respective base 112b and 113b is exposed to the −3 volts present on capacitors 118 and 119. This negative bias voltage insures that any charge carriers accumulated on the bases of the respective transistors will be rapidly evacuated. When the circuit 110 is in a state of stable oscillation, the trickle currents supplied through resistors 124 and 125 are relatively insignificant compared to the much larger currents developed by the conduction of the transistors 112 and 113. The alternating current flowing through primary winding 111p induces a voltage at the secondary 111s for supplying to a load.

As previously described for the parallel circuit, the inductive current due to transformer 111 plays the same role in causing the voltage swings at the collectors of the transistors 112 and 113. Also, as described, the capacitor 136 limits the rate of rise in voltage at the collectors. The shunt diodes 122 and 123 are also present to provide a path for the reverse current. Because of the means of obtaining the negative bias, i.e. by the Zener diodes 120 and 121 (or equivalent), the presence of the shunt diodes 122 and 123 is particularly important.

The preferred embodiment has been shown and described as containing two saturable current transformers that are non-coupled to each other. It is also possible to provide the improved bias control by using a single current transformer as described in my earlier application and utilizing two saturable inductors that are isolated from each other.

It is to be understood that the circuit 10 shown and described is the preferred embodiment although it is to be also understood that this circuit could be modified so as to drive the emitters rather than the bases. It is also to be understood that while the circuit shows NPN transistors in this embodiment, PNP transistors could also be used with equal facility.

It is also to be understood that the embodiments shown and described are by way of example only and that many modifications and changes might be made thereto without departing from the spirit of the invention. The invention is not to be considered as limited to the embodiment shown and described except insofar as the claims may be so limited.

I claim:

1. A push-pull inverter circuit connected to a unidirectional voltage input supply and being operable to provide an alternating voltage output, the inverter circuit having a main transformer in circuit with two alternately conducting switching transistors, each having a base, an emitter and a collector, the improvement comprising:
   separate non-coupled saturable inductor means for each transistor connected in circuit with the base-emitter junction thereof; and
   circuit means effective to establish an operating bias potential at the base of each transistor lower than the respective emitter potential whereby each saturable inductor means upon saturation provides an effective direct connection between said base and said operating bias potential for ensuring the rapid evacuation of charge carriers from the base for thereby turning the transistor off.

2. The inverter circuit of claim 1 including:
   positive bias means connected to said circuit means and operable to initiate conduction of one of said transistors.

3. The inverter circuit of claim 2 including:
   current limiting means connected in circuit with said positive bias means and operable to render said positive bias means effectively inoperative once said operating bias potential is established.

4. The inverter circuit of claim 1 wherein:
   said inductor means are saturable transformers.

5. The inverter circuit of claim 4 wherein:
   said circuit means includes a common bias conductor; and
   said saturable transformers each have a winding connected in circuit between said common bias conductor and a base of a transistor.

6. The inverter circuit of claim 5 wherein:
   said circuit means additionally includes a common reference conductor; and
   electrical charge storing means connected between said reference conductor and said bias conductor.

7. The inverter circuit of claim 6 wherein:
   said reference conductor is connected to said emitters of both transistors.

8. The inverter circuit of claim 7 including:
   unidirectional conductive means connected in circuit between said bases of both transistors and said reference conductor.

9. The inverter circuit of claim 8 wherein:
   said unidirectional conductive means includes a voltage dropping element effective in part to establish said operating bias potential.

10. The inverter circuit of claim 9 wherein:
    said voltage dropping element is common to said unidirectional conductive means for both said transistors.

11. The inverter circuit of claim 9 wherein:
    said voltage dropping element is a Zener diode.

12. The inverter circuit of claim 11 wherein:
    said unidirectional conductive means includes a diode connected to the base of each of said transistors; and
    said Zener diode is operatively and intermittently connected in series with each of said diodes.

13. The inverter circuit of claim 10 wherein:
    said voltage dropping element is operable to maintain said operating bias potential substantially constant during the alternate conduction of both transistors.

14. A push-pull inverter circuit connected to a unidirectional voltage input supply and being operable to provide an alternating voltage output, the inverter circuit having two alternately conducting switching transistors, each having a base, a collector and an emitter, the improvement comprising:
    first circuit means for connecting the transistors in series with the input supply voltage;
    separate non-coupled saturable inductor means for each transistor connected in circuit with the base-emitter junction thereof; and
    second circuit means effective to establish an operating bias potential at the base of each transistor lower than the respective emitter potential whereby each saturable inductor mean upon saturation provides an effective direct connection between said base and said operating bias potential for ensuring the rapid evacuation of charge carriers from the base for thereby turning the transistor off.

15. The inverter circuit of claim 14 wherein:
    said second circuit means includes a capacitor connected in circuit with each of said transistors and with each inductor means for maintaining the operating bias potential.

16. The inverter circuit of claim 15 wherein:

said second circuit means includes unidirectional conductive means connected in circuit between the base and emitter of each transistor.

17. The inverter circuit of claim 16 including:
a voltage dropping element connected in series with said unidirectional conductive means and effective in part to establish said operating bias potential.

18. The inverter circuit of claim 17 wherein:
said voltage dropping element is a Zener diode.

19. A push-pull inverter circuit connected to a unidirectional voltage input supply and being operable to provide an alternating voltage output, the inverter circuit having a main transformer in circuit with two alternately conducting switching transistors, each transistor having a base, an emitter and a collector, and the inverter circuit also having a separate, non-coupled, saturable inductor for each transistor connected in circuit with the base and emitter thereof, the improvement comprising:
shunt diode means in circuit with the collector and emitter of each transistor.

20. The inverter circuit of claim 19 including:
bias means effective to establish an operating bias potential at the base of each transistor lower than the respective emitter potential whereby each saturable inductor means upon saturation provides an effective direct connection between said base and said operating bias potential for ensuring the rapid evacuation of charge carriers from the base for thereby turning the transistor off.

21. A push-pull inverter circuit connected to a unidirectional voltage input supply and being operable to provide an alternating voltage output, the inverter circuit having two alternately conducting switching transistors connected in series, and each having a base, a collector and an emitter, and the inverter circuit also having a separate, non-coupled, saturable inductor for each transistor connected in circuit with the base and emitter thereof, the improvement comprising:
shunt diode means in circuit with the collector and emitter of each transistor.

22. The inverter circuit of claim 21, including:
bias means effective to establish an operating bias potential at the base of each transistor lower than the respective emitter potential whereby each saturable inductor means upon saturation provides an effective direct connection between said base and said operating bias potential for ensuring the rapid evacuation of charge carriers from the base for thereby turning the transistor off.

* * * * *